United States Patent [19]

Hafner et al.

[11] 4,048,446
[45] Sept. 13, 1977

[54] DATA TRANSMISSION SYSTEM

[75] Inventors: Emanuel R. Hafner, Wohlen; Zdenek Nenadal, Bern, both of Switzerland

[73] Assignee: Hasler AG, Bern, Switzerland

[21] Appl. No.: 637,283

[22] Filed: Dec. 3, 1975

[30] Foreign Application Priority Data

Dec. 10, 1974 Sweden .................... 7416355

[51] Int. Cl.² ........................... H04J 3/14
[52] U.S. Cl. .................. 179/15 AL; 179/15 BF; 179/18 EA
[58] Field of Search ........ 179/15 AL, 15 BF, 18 EA, 179/175.3 S, 175.2 R, 175.2 C

[56] References Cited
U.S. PATENT DOCUMENTS

| 3,458,661 | 7/1969 | Forde | 179/15 BF |
| 3,560,663 | 2/1971 | Lee | 179/18 EA |
| 3,569,635 | 3/1971 | Bloch | 179/18 EA |
| 3,578,917 | 5/1971 | Grandjean | 179/18 EA |
| 3,731,002 | 5/1973 | Pierce | 179/15 AL |

*Primary Examiner*—David L. Stewart
*Attorney, Agent, or Firm*—Brady, O'Boyle & Gates

[57] ABSTRACT

A plurality of subscriber stations and a plurality of switching points are connected in series in a loop circuit transmitting signals in one direction, parallel line sections disposed in parallel with the loop circuit are each connected with two switching points and each switching point contains a switch controlled by a failure detector and adapted for switching between a loop circuit section and a parallel line section. The transmission direction of the parallel line sections corresponds to the direction of the loop circuit; an incoming parallel line section which by-passes one or two immediately preceding switching points and an out-going parallel line section which by-passes one or two immediately succeeding switching points are connected to each switching point.

5 Claims, 10 Drawing Figures

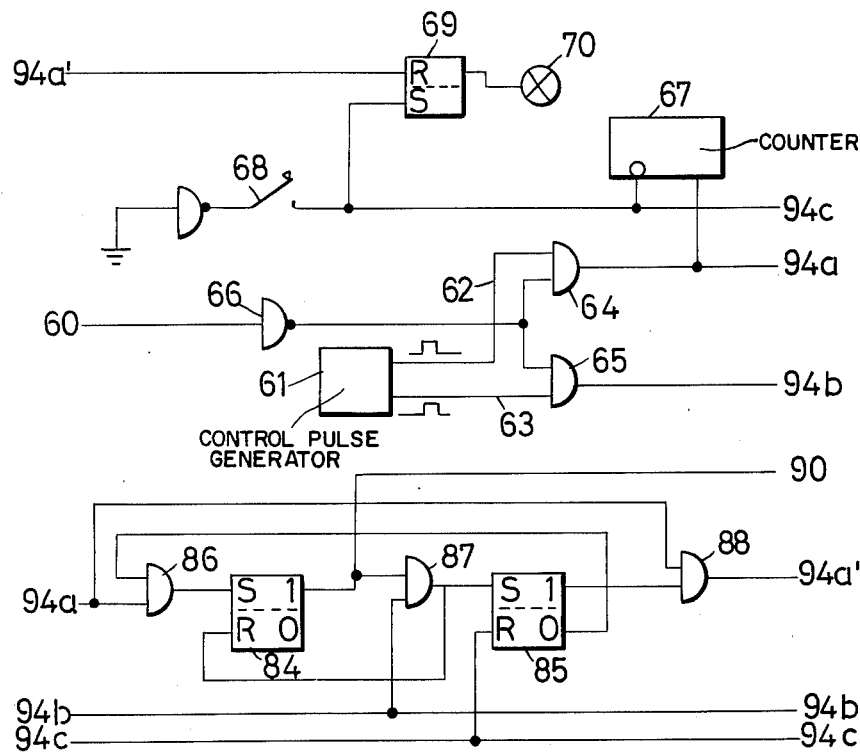
Fig. 8
Fig. 9
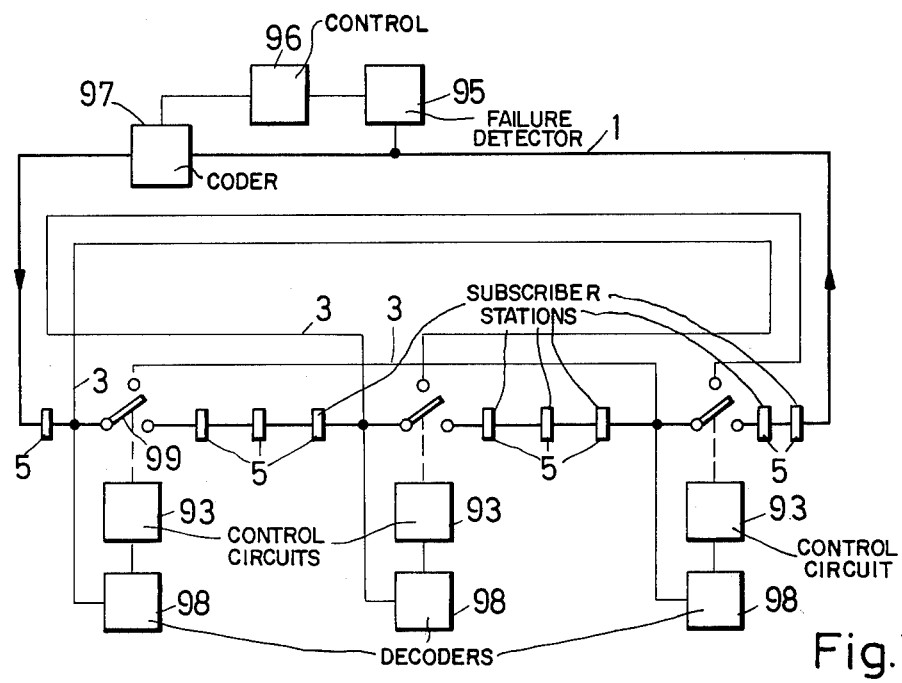
Fig. 10

DATA TRANSMISSION SYSTEM

BACKGROUND OF THE INVENTION

DESCRIPTION OF THE PRIOR ART

Data transmission systems are known wherein all the subscriber stations are connected in series in a loop circuit transmitting signals in a given direction of rotation (for example, CH patent No. 550 521). Systems of this type are subject to the disadvantage that an interruption at any point in this loop circuit renders it impossible to transmit data over the entire loop.

Data transmission systems of this type are also known wherein an interruption at a particular point in the loop circuits only affects data transmission in one part of the loop. In all these systems: all the subscriber points and a plurality of switching stations are connected in series in the loop circuit, parallel line sections disposed in parallel with the loop line are each connected with two switching points and each switching point contains a switch controlled by a failure detector and adapted for switching between a loop circuit section and a parallel line section. As a result of this arrangement, only the subscriber stations disposed between the respective two switching points in the loop circuit are excluded from data transmission because of the failure, whereas all the other subscriber stations in the remaining part of the loop circuit and the parallel line section which have been connected in, are capable of transmitting data.

In a known system of this type (CH patent No. 551 118), the parallel line sections are each disposed between two immediately consecutive switching points, thus forming an auxiliary loop circuit in which the direction of the signals is opposite to that of the loop line. The disadvantage of this system is that, through the inclusion of the auxiliary loop circuit, when a failure occurs, the transmission path is increased by a distance of almost the entire length of the loop line. This causes transit-time errors - particularly at high bit-rates. To obviate failures produced thereby, signal regenerators must be connected into the auxiliary ring line. If the loop line is simultaneously interrupted at two points, not only the affected loop line sections but also the part of the ring line disposed therebetween will be by-passed and the subscriber stations located in this part rendered ineffective. A failure in a single switching point can render the entire data transmission system ineffective.

In the case of another known system of a different type (US Pat. Nos. 3 458 661 and 3 519 935), the loop line is designed as a bifilar loop connected to a central point. Each switching station is disposed in the forward and return line of the loop. When a failure occurs, the forward and return lines of the loop are connected together. As a result, the entire portion of the bifilar loop line located on the side of the resulting connection which is remote from the central station, is short-circuited and, accordingly, all the subscriber stations disposed in this portion are excluded from data transmission. In the case of this system it is also possible for a failure in one of the switching points to render the entire transmission system ineffective.

OBJECT AND SUMMARY OF THE INVENTION

The object of the present invention is to ensure that, when an interruption occurs at a given point in the loop line, only the subscriber stations within a region containing the interrupted point of two or at most three immediately consecutive loop line sections each disposed between two switching points, will be excluded from data transmission; the latter is applicable to each case individually when interruptions occur at different, more widely dispersed points. In addition, the complete breakdown of a switching point will only affect data transmission in that particular region. As will be described hereinafter, the invention is designed to ensure that data transmission is only completely discontinued when two or at most three switching points breakdown simultaneously - assuming also that these switching points directly succeed one another in the loop line. The chances of this are so small that a breakdown of this nature virtually never occurs.

This object is achieved according to the invention in the case of a data transmission system wherein all the subscriber stations and a plurality of switching points are connected in series in a loop line transmitting signals in one direction of rotation, parallel line sections disposed in parallel with the loop line are each connected with two switching points and each swithcing point contains a switch controlled by a failure detector and adapted for switching between a loop circuit section and a parallel line section, in that the transmission direction of the parallel line sections corresponds to the rotational direction of the loop and in that an incoming parallel line section which by-passes one or two immediately preceding switching points and an out-going parallel line section which by-passes one or two immediately succeeding switching points are connected to each switching point.

Other objects, features and advantages of the data transmission system according to the invention will be made apparent in the course of the following detailed description of various preferred embodiments thereof provided with reference to the accompanying drawings.

BRIED DESCRIPTION OF THE DRAWINGS

FIG. 8 show a circuit of a control device employed in the circuit according to FIG. 7. FIG. 9 is a wiring diagram of a control circuit employed in the circuit according to FIG. 7.

FIG. 10 shows another loop circuit comprising subscriber stations, switching points and a central failure detector, wherein the control signals are transmitted via the loop circuit.

DESCRIPTION OF THE PREFERRED EMBODIMENTS

Figure 1:
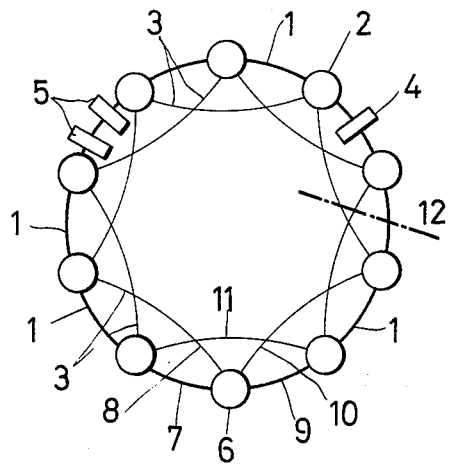
FIGS. 1 - 3 show a loop line comprising subscriber stations, switching points and parallel line sections.

FIG. 1 shows a loop line consisting of a plurality of loop line sections 1, each of which connects two switching points 2. Each switching point 2 is by-passed by a parallel line section 3. In the loop line sections 1 between the switching points 2 there are disposed subscriber stations - either individual stations 4 or a plurality of subscriber stations 5. At least one subscriber station is provided in each loop line section. Only the above-mentioned subscriber stations are indicated in the drawings. Each switching point is connected with two input lines 7 and 8 and with two output lines 9 and 10, as indicated in detail at 6. The lines 7 and 9 represent loop line sections and the lines 8 and 10 are parallel line sections. Each of these parallel line sections leads to another switching point. The switching point 6 is by-passed by the parallel line section 11. To interrupt the loop completely, all three lines between two switching points, for example, at 12, would have to be interrupted.

Figure 2:
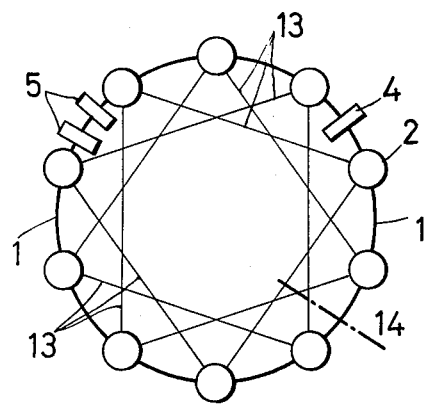

FIG. 2 shows a similar loop line but in which each parallel line section 13 is drawn from one switching point to the following third switching point. Once again, each switching point has two inputs and two outputs. All four line sections would have to be interrupted, for example, at 14, to completely cut the loop.

Figure 3:
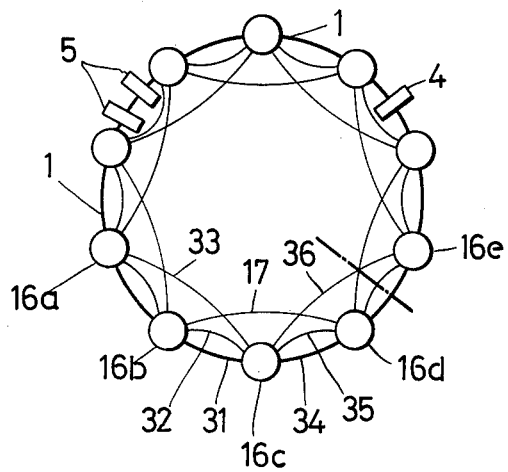

FIG. 3 shows a loop line in which each switching point is connected to a total of three incoming and four outgoing loop line and parallel line sections. In this embodiment, two parallel line sections lead to the adjacent switching points, for example, from 16c to 16b and 16d and two lead to the next point but one, for example, from 16c to 16a and 16e. Switching points 16b, 16c, or 16d is by-passed by the parallel section 33, 17 or 36 respectively. If all four line sections are interrupted at one point, for example, at 15, the system will be rendered inoperative.

The remaining figures show various embodiments of the switching point. The important point is that switching elements are provided at at least one of end of each line. The switches are controlled by signals which are produced by failure detectors and supplied to the switch via logic circuits.

Figure 4:
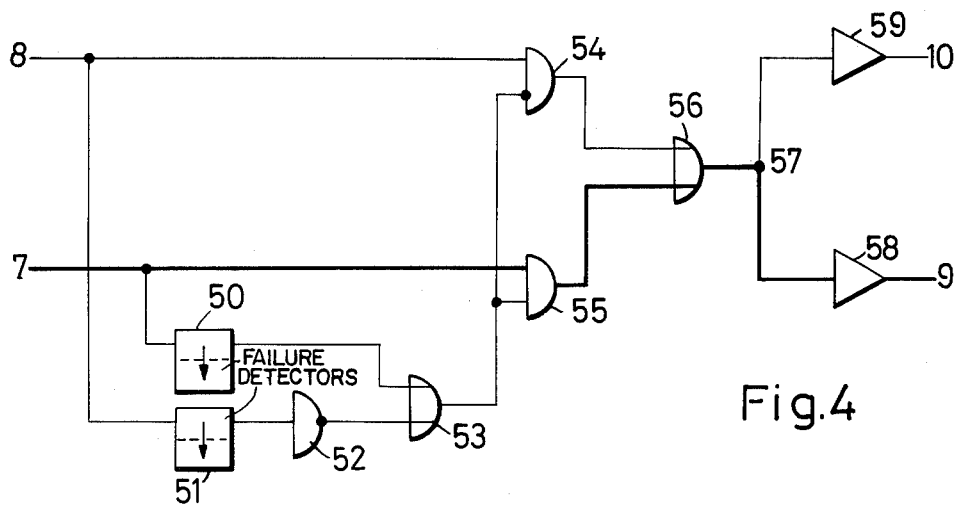
FIGS. 4 and 5 are block diagrams of a switching point comprising four connection lines.

FIG. 4 shows a switching point comprising local failure detection and switching between two incoming lines. 7 is the incoming loop line section which is connected to the input of a failure detector 50; 8 is the incoming parallel line section which is connected to the input of a failure detector 51. Each failure detector 50,51 emits the signal "0" at its output when it detects an error. The output of the failure detector 50 is directly connected to the input of an OR gate 53 and the output of the failure detector 51 is connected to the latter via an inverter 52.

The structure of the failure detectors 50,51 depends on the type of signals which are transmitted on the loop. Detectors are known which respond to pilot frequencies. In the case of pulse transmission, the simplest form of detector is a monostable multivibrator which emits a pulse whenever it responds; the pulse emitted is slightly longer than the longest pulse interval occurring on the ring during error-free operation such that continuous signals are produced at the output of the multivibrator constituting the failure detector as long as the intervals between two pulses received at its inputs are shorter than the pulse emitted by a multivibrator.

For outputs of the switching points of the loop line as indicated in FIG. 4 (57,58,59), during error-free operation, the signals are received at the two line sections 7 and 8 and each failure detector 50,51 supplies a continuous signal, the AND gate 55 is enabled and the AND= NOT gate 54 is flocked, data is transmitted via the loop line section 7, the AND gate 55, and the OR gate 56 to the line 57 to which the output lines 9 and 10 are connected via amplifiers 58 and 59. The amplifiers 58 and 59 are used for mutual decoupling of the lines 9 and 10. When the loop line section 7 is interrupted, the continuous signal at the output of the failure detector 50 is discontinued, gate 55 blocks and gate 54 is enabled and data transmission is continued via the parallel line section 8 and gates 54 and 56. If the parallel line section 8 is interrupted instead of loop line section 7, data transmission is still effected via the loop line section 7 and gates 55 and 56. A signalling device can be connected to the output of the inverter 52 for the purpose of indicating that the parallel line section 8 is no longer available for maintaining data transmission should the loop line section 7 be interrupted.

Although the monostable multivibrators cited as failure detectos only indicate the presence of a pulse or pilot frequency, it is possible to use failure detectors which also respond to transmission errors of digital signals and not only to signal interruption. With regard to the operation of a failure detector of the type shown in FIG. 5, we can assume that a synchronising signal consisting of a specific bit combination is rotating on the loop line at maximum time intervals. The failure detector shown in FIG. 5 cooperates with the shift register and decoder of a subscriber station, of which only the shift register 71 which is connected to a loop line section 7 and the decoder 72, which is connected to the register, are represented in the drawing. Upon passage of the synchronising signal the decoder 72 emits a pulse at its output 73. The regular appearance of this pulse and thus of the synchronising signal is monitored in the manner described above by a monostable multivibrator 74 which is connected to an auxiliary output 75. The output 75 is connected with the auxiliary input of the next switching point, which corresponds to the auxiliary input 77, and also with an input of an OR gate 80. A signal is supplied by the failure detector of the preceding switching point via the auxiliary line 77 and an inverter 78 to the other of the OR gate 80. A switchover from the loop line section 7 to parallel line section 8 is carried out by enabling gate 82 and blocking gate 81 when an 0 appears on the auxiliary output 75 and a 1 on auxiliary input 77: this occurs when the failure detector detects a correct signal at the preceding switching point but when this signal does not reach that particular switching point in correct form.

The fact that a failure detector has responded or that a switching operation has been effected can be locally indicated, for example, by means of a lamp which lights up, or centrally, for the purpose of having the error removed.

If a particular element at a switching point breaks down, the loop will not be interrupted as it is closed by the line 11 which is connected to adjacent switching points and which by-passes the switching point.

Figure 6:
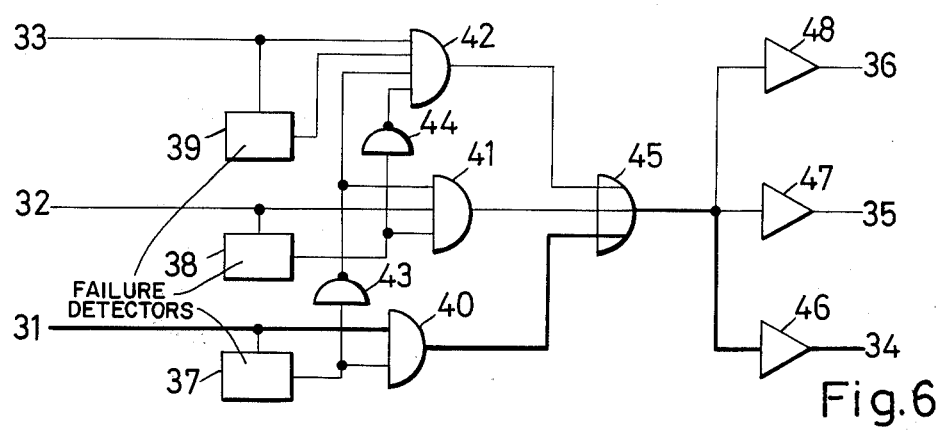
FIG. 6 is a block diagram of a switching point comprising six connection lines.

The swithcng point 16c, as used in FIG. 3, is shown in FIG. 6. In the latter, 31 represents the incoming loop line section, 32 the incoming parallel line section coming from the preceding switching point, 33 the incoming parallel line section coming from the last but one switching point. 34,35 and 36 are the corresponding outgoing lines. The incoming line sections are connected with the falure detectors 37,38 and 39 which emit the signal 1 as long as the corresponding line supplies signals.

As long as the incoming loop line section 31 supplies a signal, the output signal of the failure detector 37 keeps gate 40 enabled and the loop line is through connected. If no signal is emitted at the output of failure detector 37 but signal is emitted at the output of failure detector 38, AND gate 41 will be enabled; the output of failure detector 38 is connected directly to the AND gate 41 and the output of detector 37 is connected thereto via an inverter 43. As a result, the parallel line section 32 by-passing a loop line section, is connected through. If a signal is finally only produced at the output of failure detector 39, AND gate 42 will be opened; the latter being connected to each of the failure detectors 37 and 38 via inverters 43,44 and being directly to the of interference detector 39. The outputs of AND gates 40,41 and 42 are combined by an OR gate 45, the outputs of which are connected with the inputs of three amplifiers 46,47,48 which supply the output lines 34,35 and 36.

The preceding embodiments disclose switching points comprising failure detectors at each switching point. However, it is also possible to provide only a single central failure detector. The advantage of this feature is that a more expensive detector can be provided which will make it easier to localise the disturbance.

Figure 7:
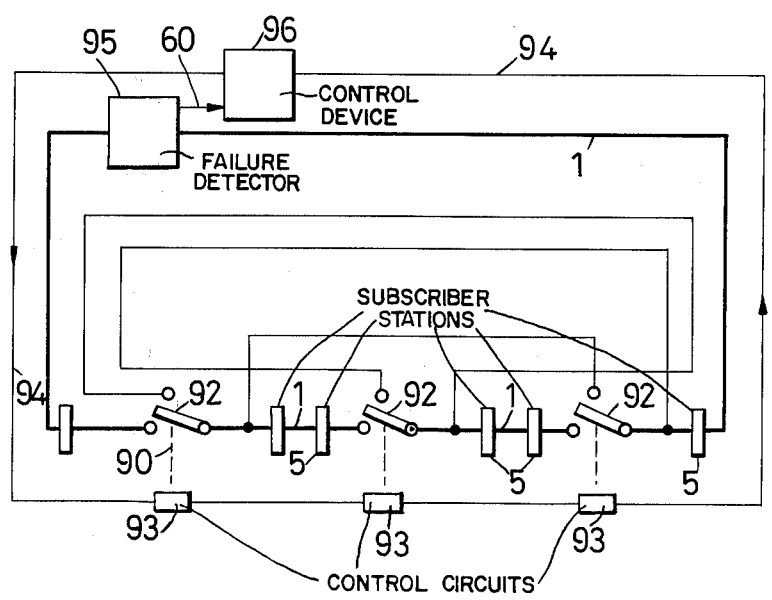
FIG. 7 shows a loop line comprising subscriber stations, switching points and a central failure detector.

FIG. 7 shows an embodiment of a system comprising a central failure detector and switching points controlled by the latter. FIG. 7 shows a loop line 1 comprising three switching points with switches 92 and control circuits 93. A failure detector 95 is disposed in the loop as indicated, for example, by units 71 − 74 in FIG. 5. During normal operation traffic is carrid on through the loop line sections 1. If a disturbance occurs, it will be detected by the failure detector 95 which transmits a signal to the control device 96. The latter, in turn, switches one switch 92 after the other by means of remote controlled commands via the control circuits 93. This enables the faulty section to be rapidly detected. The remote controlled commands can be transmitted via an auxiliary loop 94, as indicated in FIG. 7, or via the ring.

FIG. 8 shows an embodiment of the control device 96 according to FIG. 7. It comprises an input 60 which is connected to the output of the failure detector 95 and three outputs which are connected to three leads 94a, 94b, 94c of the auxiliary line 94 leading to the control circuits 93. A generator 61 alternately produces pulses on the lines 62 and 63 which each lead to an input of an AND gate 64 or 65, the other inputs of which are connected through an inverter 66 to the input 60. As soon as the failure signal ("0" at input 60) is produced, the two AND gates 64 and 65 are enabled and pulses are produced alternately in the leads 94a and 94b. These pulses are transmitted to the control circuits 93 and they switch over the switches 92 one after the other as described hereinafter. A counter 67 simultaneously counts the pulses emitted. As soon as the parallel line section by-passing the failure point has been connected in and loop traffic has been re-established, the failure signal at input 60 disappears, the gates 64 and 65 are blocked and it is possible to determine from the counter which loop section is faulty. After repairs have been made, normal operation can be obtained by pressing a key 68. The counter is returned to zero and a reset signal is emitted on the lead 94c.

If loop traffic is not re-established in the manner described, a pulse which has passed through all the control circuits 93 is again received at the control device 96 on lead 94a. At the control device it controls the flip-flop 69, thereby triggering the alarm device 70 which indicates that either the loop line section in which the failure detector 95 is located, is faulty, or that failure has not been removed for other reasons.

The switching commands can travel through the auxiliary line 94 in the same direction as the signals on the loop or in the opposite direction thereto.

FIG. 9 shows the control circuit 93 which is provided at each switching point in FIG. 7. Two flip-flops 84 and 85 are connected in in the manner shown in FIG. 9. The set input of the flip-flop 84 is connected through an AND gate 86 to the lead 94a of the auxiliary line 94. The control input of flip-flop 85 is connected through an AND gate 87 to the lead 94b of the auxiliary line 94. The other inputs of the two AND gates are connected to the zero output of flip-flop 85 or to the one output. of flip-flop 84. One input of an AND gate 88 is connected to the lead 94a; the other is connected to the one output of flip-flop 85 and the output of this gate 88 is connected to the lead 94a which corresponds to the lead 94a at the input of the next switching point.

Normally the two flip-flops 84 and 85 are reset in the rest state. The first pulse on lead 94a sets flip-flop 84: the switch 92 of the switching point is simultaneously switched over through the output 90. The first pulse on lead 94b sets flip-flop 85 and resets flip-flop 84, whereupon this pulse ceases and the switch 92 is reset. The pulse on lead 94b is not produced if the switching point again connects through loop traffic. If this does not happen, the next pulse on lead 94a passes through the AND gate via lead 94a' to the next switching point. A pulse on lead 94c returns all the flip-flops and switches to the rest position.

Instead of transmitting the switching commands through the auxiliary line 94, as described in reference to FIG. 7, these commands can also be transmitted through the loop line as long as this is in order. In FIG. 10, 1 refers to the loop line; 3 are parallel line sections. As described in reference to FIG. 7, 95 represents the failure detector, 96 is the control device which produces the control signals. These signals are coded by means of a coder 97 and transmitted through the loop. The control signals are decoded by a decoder 98 and supplied to the control circuits 93 which activate the switches 99. The latter are mounted at the input of the branching point between the loop line section and the parallel line section. The modus operandi of this embodiment is otherwise identical to that described in reference to FIG. 7.

Figure 5:
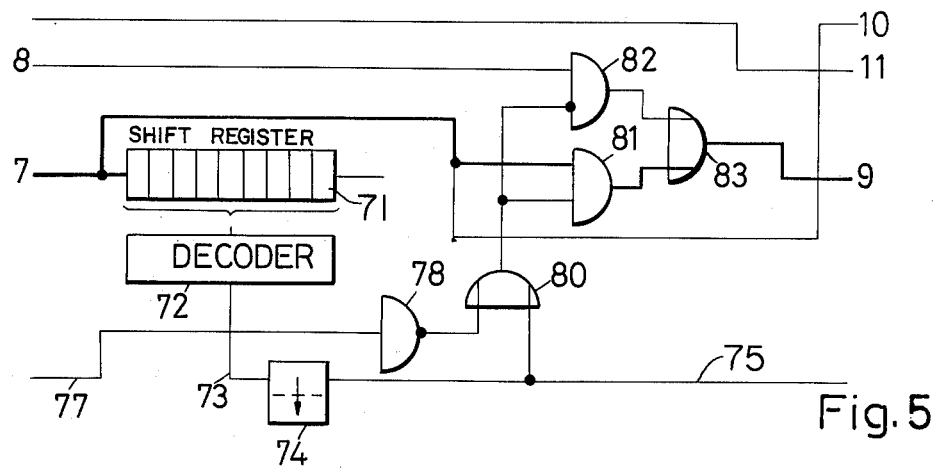

What is claimed is:
1. A data transmission system comprising
   a unidirectional transmission loop, consisting of a plurality of loop sections (1,7,9) each having an input and an output end;
   a plurality of switching points (2,6) each connected between the two adjoining input and output ends of two successive loop sections;
   a plurality of subscriber stations (4,5) connected in series to the loop;
   a plurality of parallel line sections (3,8,10,11) each having an input end and an output end and by-passing two successive loop sections, the input end of one parallel line section and the output end of one further parallel line section (10) are connected to each switching point (6);
   the output end of the loop section (7), which is connected to the switching point (6), is connected to the input end of the said further parallel line section (10);
   switching means (81-83) included in each switching point having a first position connecting the output end of the loop section (7), which is connected to the switching point, to the input end of the loop section (9), which is connected to the switching point, and having a second position connecting the output end of said parallel line section (8), which is connected with the switching point, to the input end of the loop section (9), which is connected to the switching point;

failure detecting means (71-74) included in each switching point having an input connected to the output end of the loop section (7) which is connected to the switching point and having an output delivering an output signal in response to signal failures at its input;

control means (78,80) each associated to one switching means and having a first control input connected to the output of the failure detecting means of the respective switching point and a second control input connected to the output of the failure detecting means of the preceding switching point;

each switching means (81-83) is in the first position when no failure signal is present on the first control input, and is in the second position when a failure signal is present at its first control input and simultaneously no failure signal is present at the second input (FIG. 1 and 5).

2. A data transmission system, comprising a unidirectional transmission loop, consisting of a plurality of loop sections; each having an input and a output end;

a plurality of switching points (16a-16e) each connected between the two adjoining input and output ends of two successive loop sections;

a plurality of subscriber stations (4,5) connected in series to the loop;

a plurality of a first parallel line sections (32,35) each having an input and an output end and by-passing one loop section (31,34), and a plurality of second parallel line sections (17,33,36) each having an input and an output end and by-passing two successive loop sections (31,34);

each switching point (16c) is connected to the output ends of a first and a second parallel line section (32,33) having its inputs connected to the first and second preceeding switching point (16b and 16a) respectively on the loop, and is connected by a first and a second further parallel line section (35,36) to the first and second succeeding switching point (16d and 16e) respectively on the loop;

each switching point (FIG. 6) including first, second and third failure detecting means (37,38,39);

switching means (40-45) in each switching point (FIG. 6) having a first, a second and a third position and connecting in the first position the output end of the loop section (31), which is connected to the switching point, in the second position the output end of said first parallel line section (32), and in the third position the output of said second parallel line section (33) to the input of the loop section (34) and to the input of said first and second further parallel line sections (35,36);

each of said first, second and third failure detecting means (37,38,39), having an input and an output delivering a failure signal in response to signal failures at its input;

the input of the first failure detecting means (37), is connected to the output end of the loop section (31), which is connected to the switching point, and the inputs of the second and third failure detecting means are connected to the output ends of said first and second parallel line section (32,33) respectively, control means (43,44) in each switching means (40,41,42,45) having a first, a second and a third control input connected to the output of the first, second and third failure detecting means (37,38,39) respectively;

each switching means 40,41,42,45) is in the first position when no failure signal is present on the first input of the associated control means, in its second position when a failure signal is present on the first input and simultaneously no failure is present at the second input of the control means and in its third position when failure signals are simultaneously present at the first and second inputs of the control means (FIG. 3 and 6).

3. A data transmission system, comprising a unidirectional transmission loop, consisting of a plurality of loop sections (1); each having an input and an output end;

a plurality of switching points (90,92,93) each connected between the two adjoining input and output ends of two successive loop sections;

a plurality of subscriber stations (5) connected in series to the loop;

a plurality of parallel line sections each having an input end and an output end and by-passing at least one and not more than two successive switching points on the loop;

the output end of only one parallel line section and the input end of only one further parallel line section are connected to each switching point;

only one further detecting means (95) is provided for the system and having an input connected to the output of one of the loop sections and having an output (60) delivering failure signals in response to signal failures at its input;

a control device (96) having an input connected to the output of the failure detecting means (95);

switching means (92) included in each switching point having a first position connecting the ends of the loop section, which are connected to the switching point, to each other, and having a second position connecting the end of one of said loop sections to the end of that of said parallel line section which by-passes the other loop section and at least one and not more than two further consecutive loop sections;

control means (93) associated to each switching means (92) and being connected in series, and the control means at the input end of the series connection is further connected to the control device (96) and in response to a failure signal, the said control means (93) switches the associated switching means from the first position to the second position and, when the failure signal remains, switches the switching means back to the first position and in this position passes the further failure signals to the next following control means, each control means responds as the said control means until the failure signal ceases in the second position of one of the switching means (FIG. 7).

4. A data transmission system as set forth in claim 3, in which the control means (FIG. 9) of each switching means has a first, a second and a third input (94a, 94b, 94c) and an output (94a') and all control means are connected in series on its first inputs and its outputs;

the control device (FIG. 8) has a first, a second and a third output (94a, 94b, 94c) and including gating means (64,65) having an input (60) connected to the output of the failure detecting means (95), a control pulse generator (61) delivering alternately first and second control pulses to the first and second output (94a, 95b) respectively via the gating means (64,65) and means (68) for optionally delivering a reset signal to the third output (94c);

the first output of the control device is connected to the first input (94a) of the control means (93 and FIG. 9) at the input end of the series connection of the control means, and the second and the third outputs (94c) of the control devices are connected to the second and the third inputs (94c) of all control means;

each control means has a first state in which the associated switching means is in the first position, a second state in which the switching means is in the second position, and a third state in which the switching means is in its first position and the first input of the control means is connected to the output thereof;

each control means is switchable by a control pulse on its first input from its first to its second state, by a control pulse on its second input from its second to its third state, and by a reset signal at its third input from its third to its first state (FIG. 7,8,9).

5. A data transmission system comprising a main unidirectional transmission loop composed of a plurality of main loop sections each having an input end and an output end, and a plurality of switching points each connected between the output end of one main loop section and the input end of the following main loop section;

a plurality of subscriber stations connected in series to the main loop;

at least one auxiliary loop for unidirectional transmission parallel to the main loop and in the same sense but containing no subscriber station and being composed of a plurality of auxiliary loop sections each having an input end connected to one switching point and an output end connected to the second or third following switching point on the main loop so that each switching point is connected to the output end of one main loop section and to the input end of the following section of the main loop and to the output end of one auxiliary loop section and to the input end of the following section of said auxiliary loop;

failure detecting means (50) in each switching point (FIG. 4) responsive to signal failures in the main loop;

switching means provided in each switching point and control means each associated to one switching means and controlled by the failure detecting means for switching over from a main loop section to an auxiliary loop section;

each switching means (54–56) has a first position connecting the output end of said one main loop section (7) to the input end of the said following mail loop section (9) and to the input end of said auxiliary loop section (10), and having a second position connecting the output end of said one auxiliary loop section (8) to the input end of said following main loop section (9) and to the input end of said following auxiliary loop section (10);

The failure detecting means (50) having an input connected to the output of said one main loop section (7) and an output delivering in response to signal failures at its input a failure signal to the control means (52,53);

the switching means (54–56) are in the first position when no failure signal is present on the control means (52,53) and in the second position when failure signals are present on the control means (FIGS. 1 and 4).

* * * * *